US011606759B2

(12) United States Patent
Li (10) Patent No.: US 11,606,759 B2
(45) Date of Patent: Mar. 14, 2023

(54) WIRELESS SIGNAL RECEIVING DEVICE AND METHOD (71) Applicant: REALTEK SEMICONDUCTOR CORPORATION, Hsinchu (TW)

(72) Inventor: Yi-Lin Li, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/356,579

(22) Filed: Jun. 24, 2021

(65) Prior Publication Data
US 2022/0060996 A1 Feb. 24, 2022

(30) Foreign Application Priority Data
Aug. 20, 2020 (TW) ................. 109128446

(51) Int. Cl.
*H04W 52/24* (2009.01)
*H04W 52/02* (2009.01)
(52) U.S. Cl.
CPC ....... *H04W 52/24* (2013.01); *H04W 52/0225* (2013.01)
(58) Field of Classification Search
CPC . H04W 52/0225; H04W 52/24; H04W 52/02; H04B 17/345; H04B 1/10; H04B 17/309; H04L 25/03; H04L 5/00
USPC ........................................... 370/311
See application file for complete search history.

(56) References Cited

U.S. PATENT DOCUMENTS

| 8,228,431 B2 * | 7/2012 | Gao ........................ H04N 5/50 |
| | | 348/731 |
| 2005/0207351 A1 * | 9/2005 | Inagawa ................ H04B 1/715 |
| | | 370/335 |
| 2006/0089114 A1 * | 4/2006 | Maxim ..................... H03L 7/18 |
| | | 455/192.3 |

(Continued)

OTHER PUBLICATIONS

OA letter of the counterpart TW application(appl. No. 109128446) mailed on Aug. 3, 2021. Summary of the OA letter: Claims 1, 3-7, and 9 are rejected as being unpatentable (US 2011/0021142 A1) in view of (US 2006/0188004 A1). Claims 2, 8, and 10 are rejected as being unpatentable in view of and further in view of (US 2008/0107206 A1).

*Primary Examiner* — Nathan S Taylor
(74) *Attorney, Agent, or Firm* — WPAT, PC (57) ABSTRACT

Disclosed is a wireless signal receiving device and method capable of making different adjustments for different kinds of wireless communication to configure the device itself adaptively. The device includes an analog-front-end receiving circuit and a media access control (MAC) and post-processing circuit. The analog-front-end receiving circuit receives a first (second) communication signal through first (second) wireless communication in a first (second) duration and then generates a first (second) reception signal according to the first (second) communication signal. The MAC and post-processing circuit adjusts at least one parameter of the first (second) wireless communication according to updated setting of the first (second) wireless communication and thereby configures the device adaptively, wherein the updated setting of the first (second) wireless communication is determined according to the first (second) reception signal or first (second) subsidiary information dependent on the first (second) wireless communication.

14 Claims, 8 Drawing Sheets

(56) References Cited

U.S. PATENT DOCUMENTS

| | | | |
|---|---|---|---|
| 2006/0188004 A1* | 8/2006 | Kizu | H04B 1/7136 375/132 |
| 2008/0107206 A1* | 5/2008 | Jensen | H03D 3/007 375/316 |
| 2010/0103989 A1* | 4/2010 | Smith | G01S 5/10 375/150 |
| 2011/0021142 A1* | 1/2011 | Desai | H04W 4/80 455/41.2 |
| 2012/0034891 A1* | 2/2012 | Chen | H04L 27/0008 455/226.1 |
| 2012/0034895 A1* | 2/2012 | Xuechu | H03K 5/1532 455/341 |
| 2018/0351768 A1* | 12/2018 | Alelyunas | H04L 5/0048 |
| 2019/0068153 A1* | 2/2019 | Arslan | H03F 3/19 |
| 2020/0008044 A1* | 1/2020 | Poornachandran | H04W 24/08 |
| 2021/0036726 A1* | 2/2021 | Muehlmann | H04L 27/2071 |

\* cited by examiner

WIRELESS SIGNAL RECEIVING DEVICE AND METHOD

BACKGROUND OF THE INVENTION

1. Field of the Invention

The present disclosure relates to wireless signal reception, especially to a wireless signal receiving device and method capable of making different adjustments for different wireless communication reception.

2. Description of Related Art

According to some communication protocols, a wireless communication receiver (e.g., Bluetooth receiver) is allowed to establish links with multiple link partners. Among these links, some link has good communication quality while some link does not. The link having good communication quality can optionally apply power-saving setting while the link having bad communication quality should apply high-performance setting requiring more power. However, a general wireless communication receiver is incapable of applying different settings for different links; normally, the general wireless communication receiver applies settings as a trade-off between different metrics (e.g., high-performance setting and power-saving setting).

SUMMARY OF THE INVENTION

An object of the present disclosure is to provide a wireless signal receiving device and method as an improvement over the prior art.

An embodiment of the wireless signal receiving device of the present disclosure can perform different wireless communication operations with different wireless devices respectively or perform different wireless communication operations with one single wireless device, and can make different adjustments for different wireless communication links. This embodiment includes a front-end receiving circuit and a media access control (MAC) and post-processing circuit. The front-end receiving circuit is configured to receive a first communication signal through first wireless communication in a first communication duration and then generate a first reception signal according to the first communication signal. The front-end receiving circuit is also configured to receive a second communication signal through second wireless communication in a second communication duration and then generate a second reception signal according to the second communication signal. The front-end receiving circuit does not receive any signal through the second wireless communication in the first communication duration, and does not receive any signal through the first wireless communication in the second communication duration. The first wireless communication is between the wireless signal receiving device and a first wireless device, and the second wireless communication is between the wireless signal receiving device and a second wireless device; or each of the first wireless communication and the second wireless communication is between the wireless signal receiving device and one single wireless device while the first wireless communication and the second wireless communication are a first kind of wireless communication and a second kind of wireless communication respectively. The MAC and post-processing circuit is coupled to the front-end receiving circuit, and is configured to adjust at least one parameter for the first wireless communication according to updated first setting of the first wireless communication and configured to adjust at least one parameter for the second wireless communication according to updated second setting of the second wireless communication. The updated first setting is determined according to the first reception signal and/or first subsidiary information; and the updated second setting is determined according to the second reception signal and/or second subsidiary information. The updated first setting is equivalent to or different from the updated second setting; and the first subsidiary information and the second subsidiary information are dependent on the first wireless communication and the second wireless communication respectively.

An embodiment of the wireless signal receiving method is performed with a wireless signal receiving device. This embodiment can make adjustments for first wireless communication and second wireless communication respectively, and includes the following steps: receiving a first communication signal through the first wireless communication in a first communication duration and then generating a first reception signal according to the first communication signal; receiving a second communication signal through the second wireless communication in a second communication duration and then generating a second reception signal according to the second communication signal; adjusting at least one parameter for the first wireless communication according to updated first setting of the first wireless communication, wherein the updated first setting is determined according to the first reception signal and/or first subsidiary information; and adjusting at least one parameter for the second wireless communication according to updated second setting of the second wireless communication, wherein the updated second setting is determined according to the second reception signal and/or second subsidiary information. The updated first setting is equivalent to or different from the updated second setting. The first wireless communication is between the wireless signal receiving device and a first wireless device, and the second wireless communication is between the wireless signal receiving device and a second wireless device; or each of the first wireless communication and the second wireless communication is between the wireless signal receiving device and one single wireless device while the first wireless communication and the second wireless communication are different kinds of wireless communication. The first subsidiary information and the second subsidiary information are dependent on the first wireless communication and the second wireless communication respectively.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 2c shows the transmission operation (TX), reception operation (RX), and event trigger window (LT) of the devices of FIG. 2a.

DETAILED DESCRIPTION OF THE PREFERRED EMBODIMENTS

The present disclosure provides a wireless signal receiving device and method. The device and method can make different adjustments for different wireless communication links to configure the device adaptively. For better understanding, Bluetooth is taken in the following description; however, other kinds of wireless communication (e.g., wireless local area network (WLAN)) can also apply the device and/or method of the present disclosure, if practicable.

Figure 1:
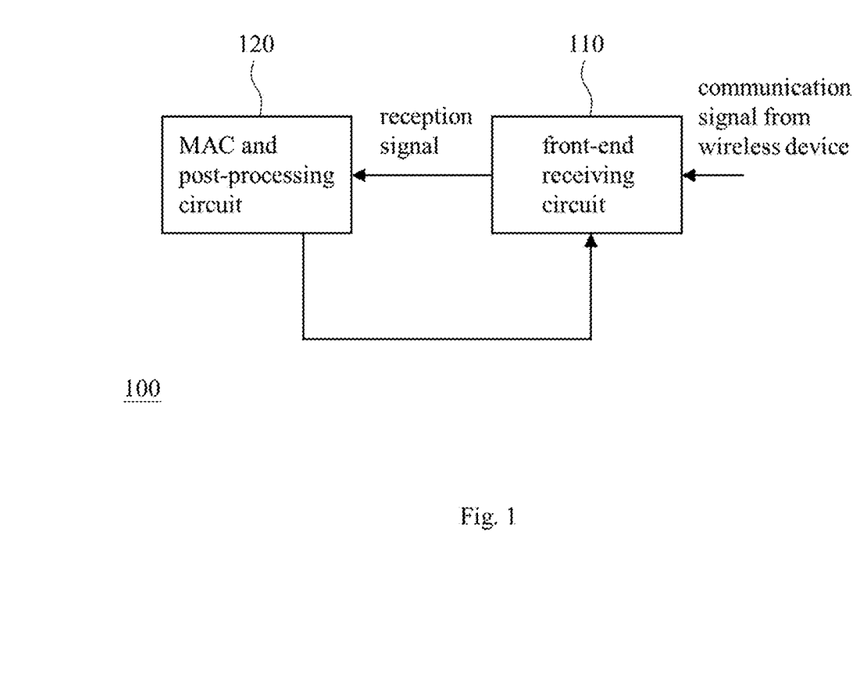
FIG. 1 shows an embodiment of the wireless signal receiving device of the present disclosure.

FIG. 1 shows an embodiment of the wireless signal receiving device of the present disclosure. The wireless signal receiving device 100 of FIG. 1 can perform different kinds of wireless communication including first wireless communication and second wireless communication, and can make adjustments for the first wireless communication and the second wireless communication respectively; accordingly, parameters for each wireless communication can be adjusted/optimized according to design/usage requirements (e.g., a power-saving requirement, a performance requirement, or a trade-off requirement as a compromise between different requirements). The first wireless communication is between the wireless signal receiving device 100 and a first wireless device (e.g., the first wireless device 210 in FIG. 2a) and the second wireless communication is between the wireless signal receiving device 100 and a second wireless device (e.g., the second wireless device 220 in FIG. 2a); or alternatively the first wireless communication is a first kind of wireless communication between the wireless signal receiving device 100 and a wireless device (e.g., the wireless device 230 in FIG. 2b) and the second wireless communication is a second kind of wireless communication between the wireless signal receiving device 100 and the same wireless device.

For example, the aforementioned first kind of wireless communication and second kind of wireless communication are two kinds of logical links specified in the Bluetooth specification, wherein the two kinds of logical links can be the same or different by logical link categories. According to the Bluetooth specification, the logical link categories include: Link Control (LC); ACL Control (ACL-C and ASB-C); User Asynchronous/Isochronous (ACL-U and ASB-U); User Synchronous (SCO-S); User Extended Synchronous (eSCO-S); and Profile Broadcast Data (PBD). For another example, the first kind of wireless communication and the second kind of wireless communication apply a first Bluetooth protocol (e.g., BT Legacy) and a second Bluetooth protocol (e.g., Bluetooth Low Energy) respectively. Each of the above-mentioned wireless communication can be performed with an established link or without any established link; for example, the communication without any established link can be one of BT Legacy Scan, BLE SCAN, BLE ADV Response, and LE Audio that are known in this technical field. The wireless signal receiving device 100 includes a front-end receiving circuit 110 and a media access control (MAC) and post-processing circuit 120 that are described in the later paragraphs.

Figure 2A:
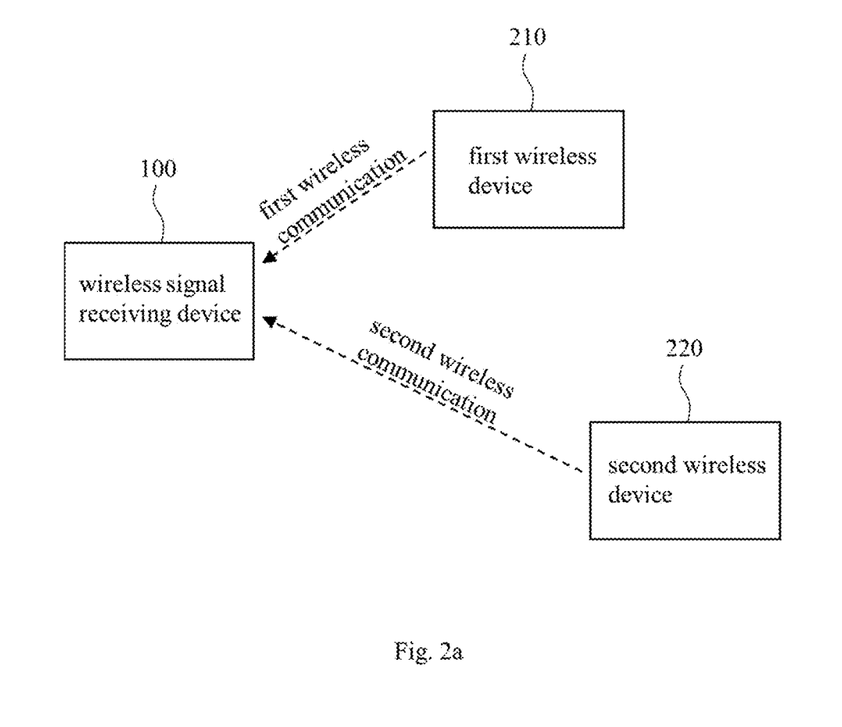
FIG. 2a shows the wireless communication between the wireless signal receiving device of FIG. 1 and each of the first wireless devices and the second wireless device.
Figure 2B:
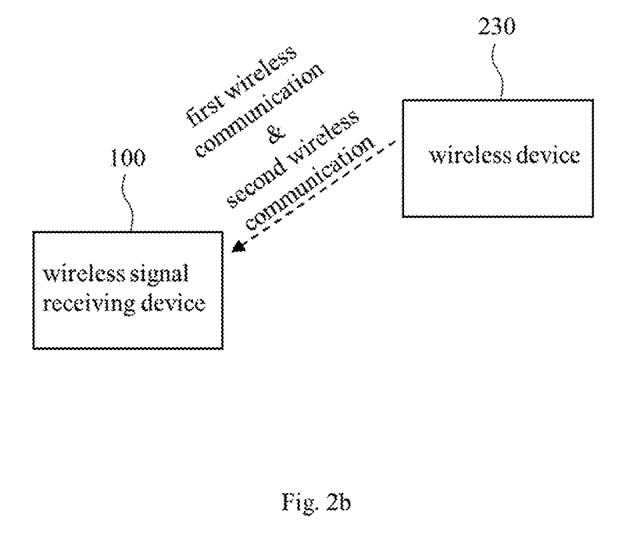
FIG. 2b shows different kinds of wireless communication between the wireless signal receiving device of FIG. 1 and one signal wireless device.
Figure 2C:
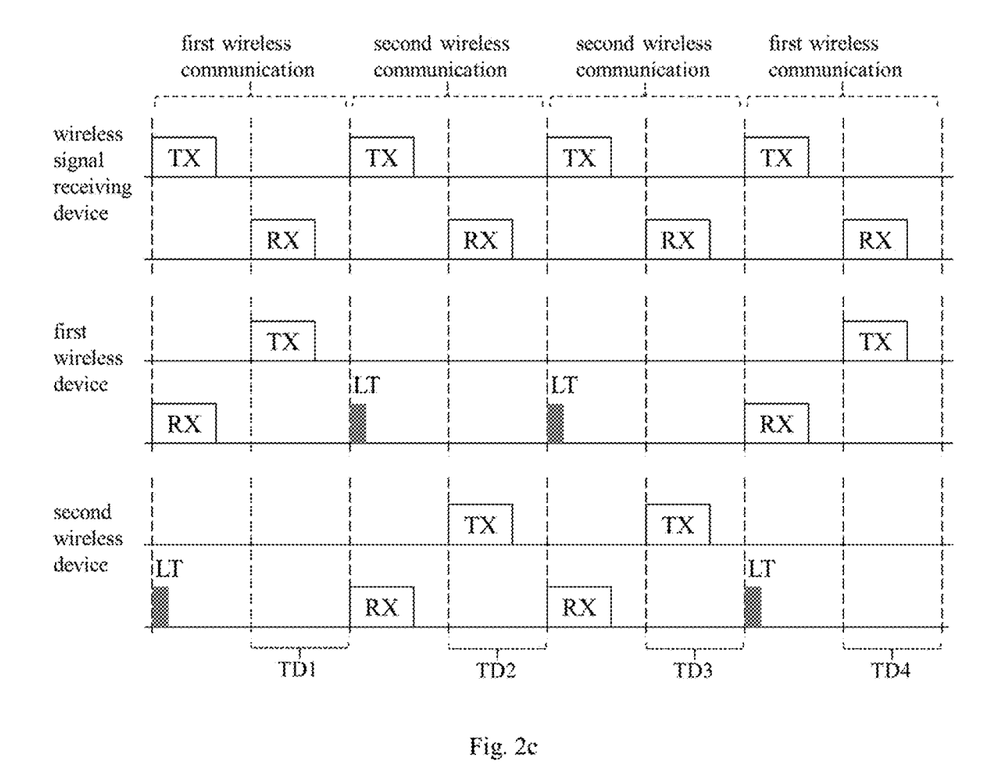
Figure 2D:
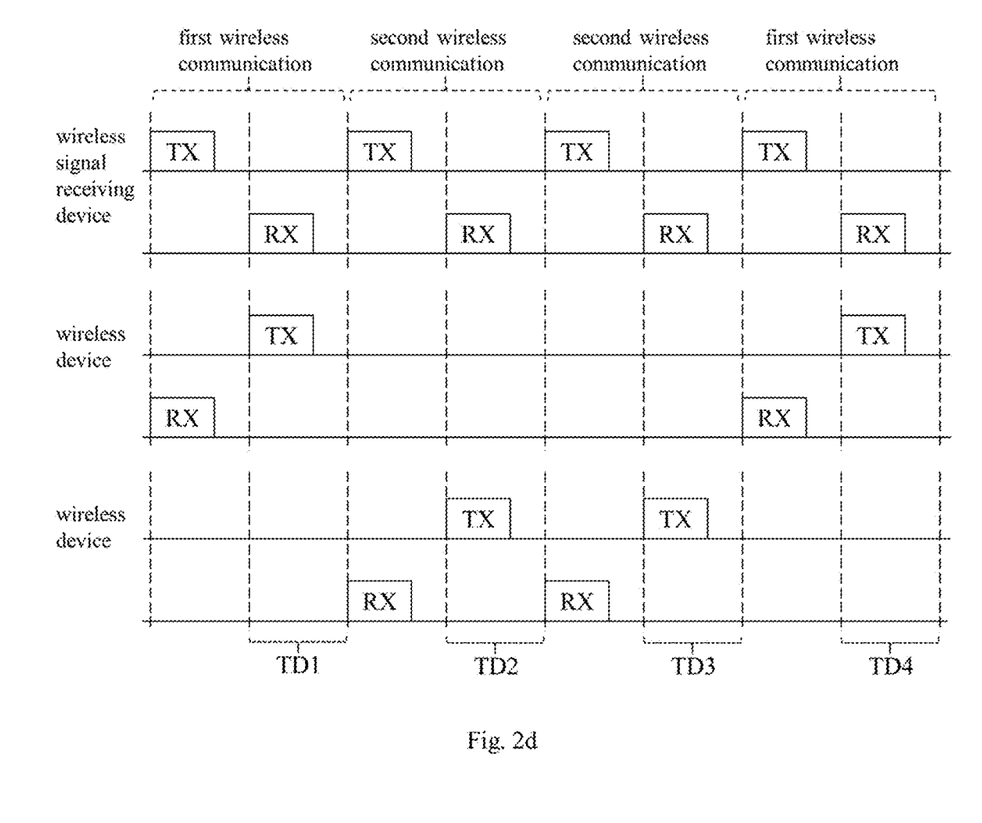
FIG. 2d shows the transmission operation (TX) and reception operation (RX) of the devices of FIG. 2b.

Please refer to FIG. 1 and FIGS. 2a-2d. FIG. 2a shows the aforementioned first wireless communication between the wireless signal receiving device 100 (e.g., smart phone) and a first wireless device 210 (e.g., Bluetooth earphone) and shows the aforementioned second wireless communication between the wireless signal receiving device 100 and a second wireless device 220 (e.g., smart watch), wherein each of the first wireless device 210 and the second wireless device 220 can be a known/particular link partner or a unknown/unspecified link partner. FIG. 2b shows that both the first wireless communication and the second wireless communication are between the wireless signal receiving device 100 and one single wireless device 230. FIG. 2c shows the transmission operation (TX), reception operation (RX), and event trigger window (LT) of the devices in FIG. 2a; in FIG. 2a and FIG. 2c, the wireless signal receiving device 100 functions as a master device while each of the first wireless device 210 and the second wireless device 220 functions as a slave device. FIG. 2d shows the transmission operation (TX) and reception operation (RX) of the devices in FIG. 2b; in FIG. 2b and FIG. 2d, the wireless signal receiving device 100 functions as a master device while the wireless device 230 functions as a slave device. It should be noted that the embodiments of FIGS. 2a-2d are examples for understanding rather than limitations on the scope of the present invention.

As shown in FIGS. 1, 2a, and 2c, the front-end receiving circuit 110 is configured to receive a first communication signal through the first wireless communication in a first communication duration (i.e., the duration "TD1" in FIG. 2c) and then generate a first reception signal according to the first communication signal; the front-end receiving circuit 110 is also configured to receive a second communication signal through the second wireless communication in a second communication duration (i.e., the duration "TD2" in FIG. 2c) and then generate a second reception signal according to the second communication signal. The front-end receiving circuit 110 does not receive any signal through the second wireless communication in the first communication duration, and does not receive any signal through the first wireless communication in the second communication duration. The labels "TX", "RX", and "LT" in FIGS. 2c and 2d are indicative of a transmission operation, a reception operation, and an event trigger window (e.g., a window over which an access correlator shall search for the correct channel access code in accordance with: BLUETOOTH SPECIFICATION Version 5.0, Vol 2, Part B) respectively.

As shown in FIGS. 1, 2b, and 2d, the front-end receiving circuit 110 is configured to receive a first communication signal through the first wireless communication in a first communication duration (i.e., the duration "TD1" in FIG. 2d) and then generate a first reception signal according to the first communication signal; the front-end receiving circuit 110 is also configured to receive a second communication signal through the second wireless communication in a second communication duration (i.e., the duration "TD2" in FIG. 2d) and then generate a second reception signal according to the second communication signal. The front-end receiving circuit 110 does not receive any signal through the second wireless communication in the first communication duration, and does not receive any signal through the first wireless communication in the second communication duration.

Figure 3:
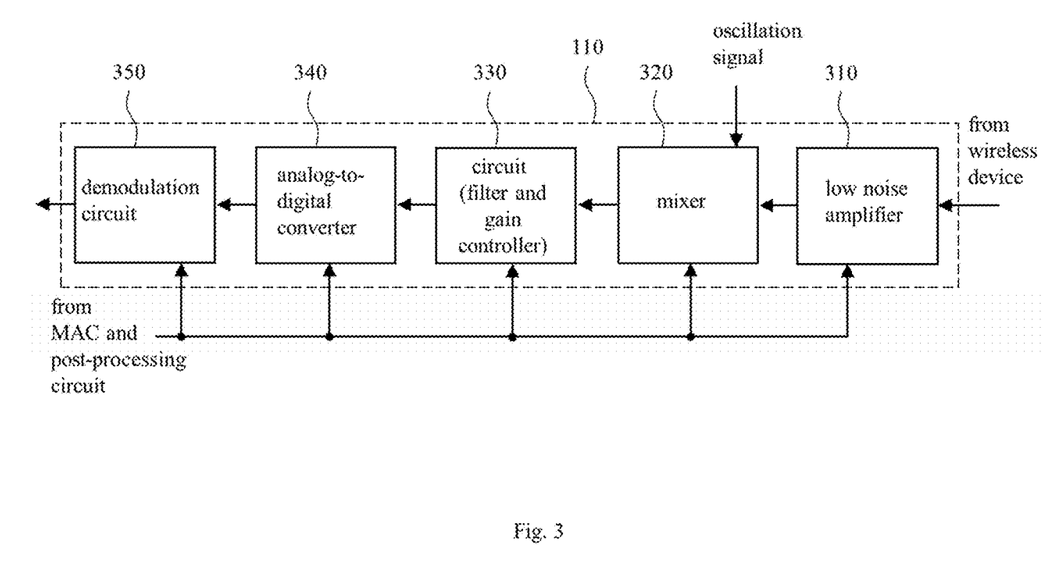
FIG. 3 shows an embodiment of the front-end receiving circuit of FIG. 1.

FIG. 3 shows an embodiment of the front-end receiving circuit 110 including: a low noise amplifier 310; a mixer 320 for receiving an oscillation signal and performing a mixing operation according to the oscillation signal; a circuit 330 for filtering and gain control (i.e., filter and gain controller); an analog-to-digital converter 340; and a demodulation circuit 350. The front-end receiving circuit 110 receives and processes a communication signal from each wireless device (e.g., the aforementioned wireless device 210/220/230) according to parameters of each circuit (e.g., initial parameters in the beginning of the circuit's operation, or parameters that are updated as time goes by) in the front-end receiving circuit 110. Since each circuit in FIG. 3 is a known/self-developed circuit, its detail is omitted here. It should be noted that other kinds of front-end circuits can be used instead as long as such replacement is practicable.

Please refer to FIGS. 1-3. The MAC and post-processing circuit 120 is coupled to the front-end receiving circuit 110, and is configured to adjust at least one first parameter (e.g., parameters including a first software parameter, a first firmware parameter, and a first hardware parameter of the wireless signal receiving device 100) for the first wireless communication according to updated first setting of the first wireless communication and to adjust at least one second parameter (e.g., parameters including a second software parameter, a second firmware parameter, and a second hardware parameter of the wireless signal receiving device 100) for the second wireless communication according to updated second setting of the second wireless communication. The updated first setting is determined according to the first reception signal and/or first subsidiary information that is/are determined at a time point or collected in a period of time. Similarly, the updated second setting is determined according to the second reception signal and/or second subsidiary information that is/are determined at a time point or collected in a period of time.

For example, the at least one first/second parameter includes one of the following: a current supply parameter of the low noise amplifier 310; a mixer parameter of the mixer 320; a filter parameter of the circuit 330; a gain control parameter of the circuit 330; a converter parameter of the analog-to-digital converter 340; and a demodulator parameter of the demodulation circuit 350. For another example, each of the first subsidiary information and the second subsidiary information includes at least one of the following: a signal format for wireless communication; master/slave roles for multiple Bluetooth links; a usage and interference state with respect to a wireless network; remaining battery power; a usage scenario (e.g., a scenario for simply maintaining a link, or a scenario for playing music); and a Bluetooth communication protocol (e.g., BT Legacy, or BLE).

It should be noted that in a circumstance that the communication quality/user demand in the first wireless communication is different from (or alternatively, the same as) the communication quality/user demand in the second wireless communication, the updated first setting of the first wireless communication can be different from (or alternatively, the same as) the updated second setting of the second wireless communication. It should also be noted that after the adjustments of the parameters for the first and second wireless communication, the front-end receiving circuit 110 receives the first communication signal through the first wireless communication according to the adjusted first parameters in a communication duration (e.g., the fourth communication duration (TD4) in FIG. 2c/2d), and receives the second communication signal through the second wireless communication according to the adjusted second parameters in another communication duration (e.g., the third communication duration (TD3) in FIG. 2c/2d).

In an exemplary implementation, the MAC and post-processing circuit 120 and/or the front-end receiving circuit 110 perform(s) a communication quality estimation process (e.g., a known/self-developed channel estimation process for estimating at least one of a received signal strength index, a packet error rate, and a signal-to-noise ratio) to generate a first (or alternatively, second) estimation result according to the first (or alternatively, second) reception signal, and then determine(s) the updated first (or alternatively, second) setting according to the first (or alternatively, second) estimation result. In another exemplary implementation, the MAC and post-processing circuit 120 receives a first estimation result and a second estimation result from a back-end circuit (e.g., a known/self-developed channel estimation circuit) (not shown), and then determines the updated first setting according to the first estimation result and determines the updated second setting according to the second estimation result. In this case, the first and second estimation results are indicative of communication quality, and the back-end circuit generates the first and second estimation results according to the outputs of the MAC and post-processing circuit 120 or according to the outputs of the front-end receiving circuit 110.

In an exemplary implementation, each of the aforementioned first estimation result and the second estimation result is used for determining at least one of the following preference: receiver sensitivity; receiver power consumption; and interference rejection. The at least one preference is used for applying a corresponding setting. For example, the updated first/second setting is applied according to the preferred receiver sensitivity and receiver power consumption, and is illustrated with Table 1 below; for another example, the updated first/second setting is applied according to the preferred receiver sensitivity, interference rejection, and receiver power consumption, and is illustrated with Table 2 below. In Table 1 and Table 2, the low-power setting inclines to low power consumption and low performance, the high-performance setting inclines to high performance and high power consumption, and the trade-off setting is a compromise between the low-power setting and the high-performance setting. The difference between different kinds of high-performance/low-power setting (e.g., $1^{st}$ high-performance setting and $2^{nd}$ high-performance setting) in the same Table is dependent on the demand for implementation. In an exemplary implementation, the updated setting corresponding to each set of estimation results is pre-stored setting (e.g., pre-stored parameters or a pre-stored mode) for convenient utilization, or is derived by introducing a set of estimation results to a predetermined algorithm; in brief, after the first (or alternatively, second) estimation result is obtained, the updated first (or alternatively, second) setting can be obtained correspondingly. The above-mentioned predetermined algorithm can be selected from known/self-developed algorithms according to the demand for implementation.

TABLE 1

Examples of receiver sensitivity and power consumption trade-offs with different settings

| | | | |
|---|---|---|---|
| receiver sensitivity | bad | medium | good |
| receiver power consumption | low | medium | high |
| updated setting | low-power setting | trade-off setting | high-performance setting |

TABLE 2

Examples of receiver sensitivity and power consumption trade-offs with different settings

| | | | |
|---|---|---|---|
| receiver sensitivity | good | medium | bad |
| interference rejection | medium | good | bad |
| receiver power consumption | medium | medium | low |
| updated setting | 1st high-performance setting | 2nd high-performance setting | low-power setting |

In an exemplary implementation, the MAC and post-processing circuit 120 transmits a mode signal to the front-end receiving circuit 110 to request the front-end receiving circuit 110 to apply parameters according to the mode signal and operate in an operation mode (e.g., power-saving mode, performance-first mode, or trade-off mode). Providing all conditions remain the same except the operation mode changing from a present mode (e.g., trade-off mode) to a power-saving mode, the MAC and post-processing circuit 120 adjusts at least one first (or alternatively, second) parameter of the first (or alternatively, second) wireless communication, and afterwards the wireless signal receiving device 100 consumes less power for signal reception under the first (or alternatively, second) wireless communication.

It should be noted that although in the aforementioned embodiments the wireless signal receiving device 100 functions as a master device and communicates with two slave devices (i.e., the wireless devices 210, 220 in FIG. 2a) or with one single slave device (i.e., the wireless device 230 in FIG. 2b), these features are not limitations on the scope of the present invention; more specifically, the wireless signal receiving device 100 can function as another role (e.g., the wireless signal receiving device 100 can be a master for some device(s) and a salve for some device(s) at the same time. In other words, the wireless signal receiving device 100 can be a master and/or a slave for multiple peer devices) and/or the number of peer device(s) can vary with the demand for implementation. In fact, no matter what the role of the wireless signal receiving device 100, the number of peer device(s), and the protocol(s) (e.g., BT Legacy, BLE) between the wireless signal receiving device 100 and the peer device(s) is/are, the wireless signal receiving device 100 can determine parameters for each wireless communication in view of the communication quality of the wireless communication and further in view of design/user requirements (e.g., a power-saving requirement, a performance requirement, or a trade-off requirement as a compromise between different requirements), and thereby the wireless signal receiving device 100 can perform different reception operations for different kinds of wireless communication respectively.

Figure 4A:
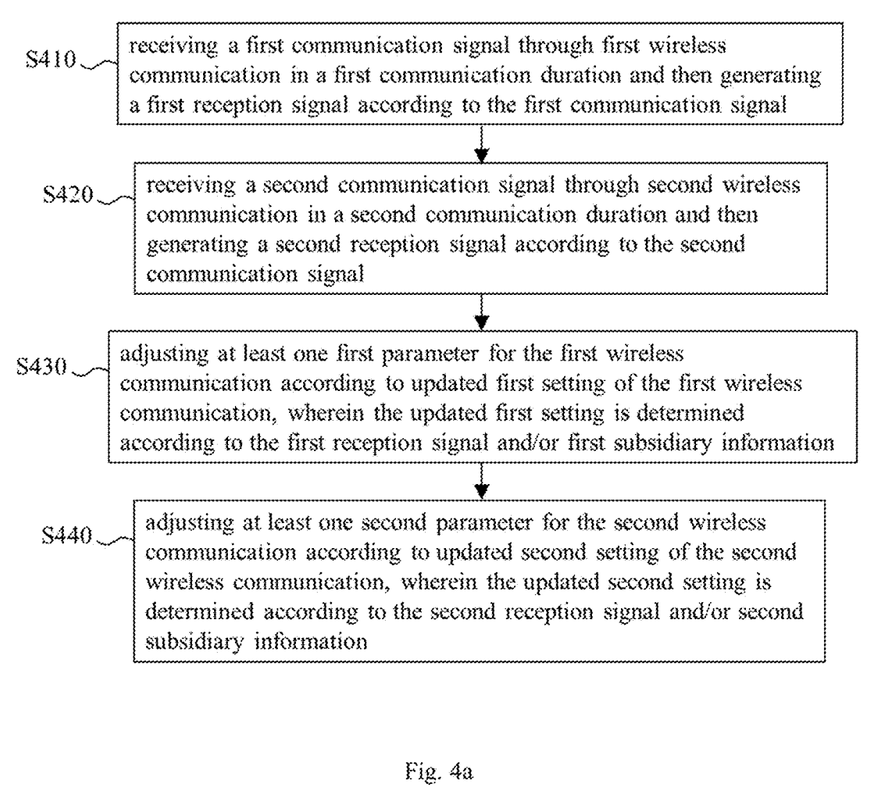
FIG. 4a shows an embodiment of the wireless signal receiving method of the present disclosure.

FIG. 4 shows an embodiment of the wireless signal receiving method of the present disclosure. This embodiment is performed with a wireless signal receiving device (e.g., the wireless signal receiving device 100 in FIG. 1), and can make different adjustments for different kinds of wireless communication respectively. The embodiment of FIG. 4 includes the following steps:

S410: receiving a first communication signal through first wireless communication in a first communication duration and then generating a first reception signal according to the first communication signal.

S420: receiving a second communication signal through second wireless communication in a second communication duration and then generating a second reception signal according to the second communication signal. The first wireless communication is between the wireless signal receiving device and a first wireless device, and the second wireless communication is between the wireless signal receiving device and a second wireless device; or each of the first wireless communication and the second wireless communication is between the wireless signal receiving device and one single wireless device while the first wireless communication and the second wireless communication are different kinds of wireless communication.

S430: adjusting at least one first parameter for the first wireless communication according to updated first setting of the first wireless communication, wherein the updated first setting is determined according to the first reception signal and/or first subsidiary information.

S440: adjusting at least one second parameter for the second wireless communication according to updated second setting of the second wireless communication, wherein the updated second setting is determined according to the second reception signal and/or second subsidiary information. The updated first setting is equivalent to or different from the updated second setting. The first subsidiary information and the second subsidiary information are dependent on the first wireless communication and the second wireless communication respectively.

It should be noted that the steps of the wireless signal receiving method of the present disclosure may be executed in another order, if practicable. For example, the steps in FIG. 4a can be rearranged as shown in FIG. 4b, wherein any two steps without any order of priority can be executed simultaneously or successively according to software/hardware design.

Figure 4B:
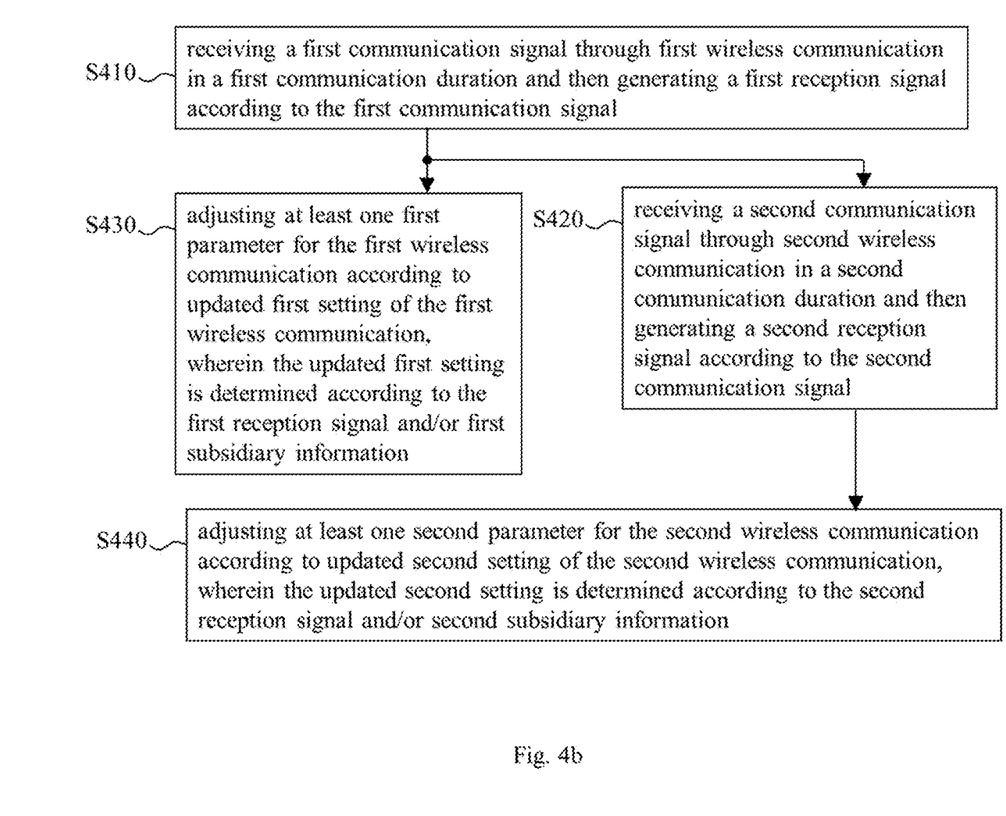
FIG. 4b shows another embodiment of the wireless signal receiving method of the present disclosure.

Since those of ordinary skill in the art can refer to the disclosure of the embodiments of FIGS. 1-3 to appreciate the detail and the modification of the embodiments of FIGS. 4a-4b, which implies that some or all of the features of the embodiments of FIGS. 1-3 can be applied to the embodiments of FIGS. 4a-4b in a logical way, repeated and redundant description is omitted here.

It should be noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly in accordance with the present disclosure.

To sum up, the device and method of the present disclosure can make different adjustments for different kinds of wireless communication respectively, and thereby adjust/optimize parameters for each wireless communication. Accordingly, the device can be configured adaptively.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A wireless signal receiving device capable of making different adjustments for different kinds of wireless communication to configure the wireless signal receiving device adaptively, the wireless signal receiving device comprising:

a front-end receiving circuit configured to receive a first communication signal through first wireless communication in a first communication duration and then generate a first reception signal according to the first communication signal, the front-end receiving circuit also configured to receive a second communication signal through second wireless communication in a second communication duration and then generate a second reception signal according to the second communication signal, wherein the front-end receiving circuit includes a low noise amplifier, a mixer, a circuit for filtering and analog gain control, an analog-to-digital converter, and a demodulation circuit in sequence; and a media access control (MAC) and post-processing circuit coupled to the front-end receiving circuit, and configured to adjust at least one first parameter for the first wireless communication according to updated first setting of the first wireless communication and to adjust at least one second parameter for the second wireless communication according to updated second setting of the second wireless communication, wherein the at least one first parameter for the first wireless communication includes a first circuit parameter of the front-end receiving circuit, the at least one second parameter for the second wireless communication includes a second circuit parameter of the front-end receiving circuit, and each of the first circuit parameter and the second circuit parameter is one of the following: an amplifier parameter of the low noise amplifier; a mixer parameter of the mixer; a filter parameter of the circuit for filtering and analog gain control; an analog gain control parameter of the circuit for filtering and analog gain control; a converter parameter of the analog-to-digital converter; and a demodulator parameter of the demodulation circuit, wherein the front-end receiving circuit does not receive any signal through the second wireless communication in the first communication duration, and does not receive any signal through the first wireless communication in the second communication duration; the first wireless communication is between the wireless signal receiving device and a first wireless device and the second wireless communication is between the wireless signal receiving device and a second wireless device, or each of the first wireless communication and the second wireless communication is between the wireless signal receiving device and one single wireless device while the first wireless communication and the second wireless communication are a first kind of wireless communication and a second kind of wireless communication respectively; the updated first setting is determined according to at least one of the first reception signal and first subsidiary information; the updated second setting is determined according to at least one of the second reception signal and second subsidiary information; the updated first setting is equivalent to or different from the updated second setting; the first subsidiary information and the second subsidiary information are dependent on the first wireless communication and the second wireless communication respectively; and each of the first subsidiary information and the second subsidiary information includes at least one of the following: a signal format for wireless communication; master/slave roles for multiple Bluetooth links; a usage and interference state with respect to a wireless network; remaining battery power; a usage scenario; and a Bluetooth communication protocol.

2. The wireless signal receiving device of claim 1, wherein the MAC and post-processing circuit adjusts the at least one first parameter for the first wireless communication, and afterwards the wireless signal receiving device consumes less power for signal reception under the first wireless communication; and the MAC and post-processing circuit adjusts the at least one second parameter for the second wireless communication, and afterwards the wireless signal receiving device consumes less power for signal reception under the second wireless communication.

3. The wireless signal receiving device of claim 1, wherein at least one of the MAC and post-processing circuit and the front-end receiving circuit perform(s) a communication quality estimation process to generate a first estimation result according to the first reception signal, and then determine(s) the updated first setting according to the first estimation result; and the MAC and post-processing circuit performs the communication quality estimation process to generate a second estimation result according to the second reception signal, and then determines the updated second setting according to the second estimation result.

4. The wireless signal receiving device of claim 3, wherein each of the first estimation result and the second estimation result is used for determining receiver sensitivity and at least one of the following preference: receiver power consumption; and interference rejection.

5. The wireless signal receiving device of claim 1, wherein the MAC and post-processing circuit receives a first result of communication quality estimation and a second result of communication quality estimation that are feedbacks from a back-end circuit receiving outputs of the MAC and post-processing circuit, and then the MAC and post-processing circuit determines the updated first setting according to the first result of communication quality estimation and determines the updated second setting according to the second result of communication quality estimation.

6. The wireless signal receiving device of claim 5, wherein each of the first result of communication quality estimation and the second result of communication quality estimation is used for determining receiver sensitivity and at least one of the following preference: receiver power consumption; and interference rejection.

7. The wireless signal receiving device of claim 1, wherein:
the at least one first parameter for the first wireless communication includes at least one of the following: a first software parameter of the wireless signal receiving device; a first firmware parameter of the wireless signal receiving device; and a first hardware parameter of the wireless signal receiving device; and
the at least one second parameter for the second wireless communication includes at least one of the following: a second software parameter of the wireless signal receiving device; a second firmware parameter of the wireless signal receiving device; and a second hardware parameter of the wireless signal receiving device.

8. A wireless signal receiving method performed with a wireless signal receiving device, the wireless signal receiving method making adjustments for first wireless communication and second wireless communication respectively, the wireless signal receiving method comprising:
receiving a first communication signal through the first wireless communication in a first communication duration and then generating a first reception signal according to the first communication signal;

receiving a second communication signal through the second wireless communication in a second communication duration and then generating a second reception signal according to the second communication signal;

adjusting at least one first parameter for the first wireless communication according to updated first setting of the first wireless communication; and adjusting at least one second parameter for the second wireless communication according to updated second setting of the second wireless communication, wherein each of the at least one first parameter and the at least one second parameter includes at least one of the following: an amplifier parameter of a low noise amplifier; a mixer parameter of a mixer; a filter parameter of a circuit for filtering and analog gain control; an analog gain control parameter of the circuit for filtering and analog gain control; a converter parameter of an analog-to-digital converter; and a demodulator parameter of a demodulation circuit, wherein the first wireless communication is between the wireless signal receiving device and a first wireless device and the second wireless communication is between the wireless signal receiving device and a second wireless device, or each of the first wireless communication and the second wireless communication is between the wireless signal receiving device and one single wireless device while the first wireless communication and the second wireless communication are different kinds of wireless communication; the updated first setting is determined according to at least one of the first reception signal and first subsidiary information; the updated second setting is determined according to at least one of the second reception signal and second subsidiary information; the updated first setting is equivalent to or different from the updated second setting; the first subsidiary information and the second subsidiary information are dependent on the first wireless communication and the second wireless communication respectively; and each of the first subsidiary information and the second subsidiary information includes at least one of the following: a signal format for wireless communication; master/slave roles for multiple Bluetooth links; a usage and interference state with respect to a wireless network; remaining battery power; a usage scenario; and a Bluetooth communication protocol.

9. The wireless signal receiving method of claim 8, wherein the at least one first parameter is adjusted to allow the wireless signal receiving device to consume less power for signal reception under the first wireless communication; and the at least one second parameter is adjusted to allow the wireless signal receiving device to consume less power for signal reception under the second wireless communication.

10. The wireless signal receiving method of claim 8, further comprising:

performing a communication quality estimation process with a front-end receiving circuit of the wireless signal receiving device to generate a first estimation result according to the first reception signal, and then determining the updated first setting according to the first estimation result; and performing the communication quality estimation process with the front-end receiving circuit to generate a second estimation result according to the second reception signal, and then determining the updated second setting according to the second estimation result.

11. The wireless signal receiving method of claim 10, wherein each of the first estimation result and the second estimation result is used for determining at least one of the following preference: receiver sensitivity; receiver power consumption; and interference rejection.

12. The wireless signal receiving method of claim 8, further comprising:

receiving a first result of communication quality estimation and a second result of communication quality estimation from a back-end circuit, and then determining the updated first setting according to the first result of communication quality estimation and determining the updated second setting according to the second result of communication quality estimation, wherein the first result of communication quality estimation and the second result of communication quality estimation are dependent on the first reception signal and the second reception signal respectively.

13. The wireless signal receiving method of claim 12, wherein each of the first result of communication quality estimation and the second result of communication quality estimation is used for determining at least one of the following preference: receiver sensitivity; receiver power consumption; and interference rejection.

14. The wireless signal receiving method of claim 8, wherein:

the at least one first parameter for the first wireless communication includes at least one of the following: a first software parameter of the wireless signal receiving device; a first firmware parameter of the wireless signal receiving device; and a first hardware parameter of the wireless signal receiving device; and the at least one second parameter for the second wireless communication includes at least one of the following: a second software parameter of the wireless signal receiving device; a second firmware parameter of the wireless signal receiving device; and a second hardware parameter of the wireless signal receiving device.

* * * * *